DAVIS & LELAND.
Slaughtering Machine.
No. 57,876.
Patented Sept. 11, 1866.
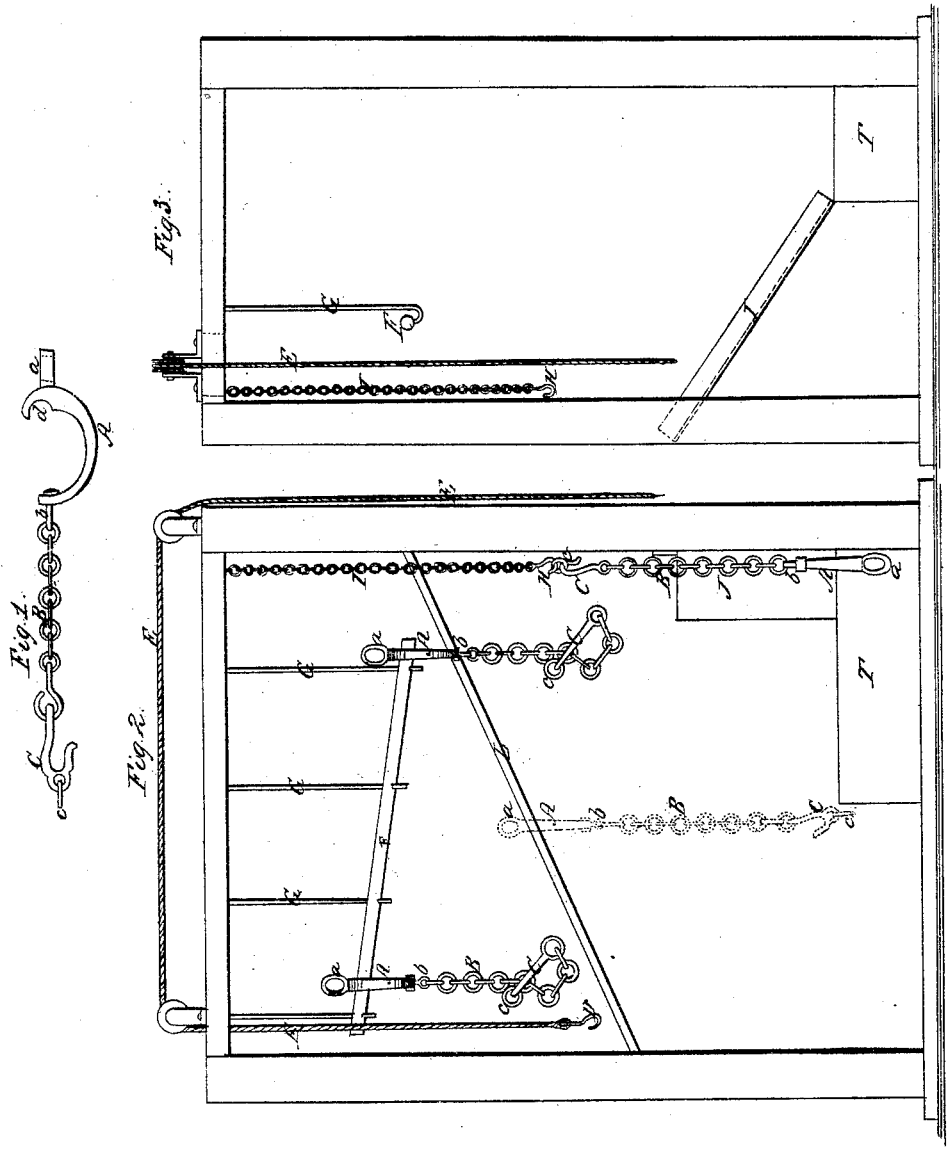

UNITED STATES PATENT OFFICE.

SAMUEL DAVIS AND WINDSOR LELAND, OF CHICAGO, ILLINOIS.

IMPROVEMENT IN CLUTCH-HOOK FOR SLAUGHTERING PURPOSES.

Specification forming part of Letters Patent No. 57,876, dated September 11, 1866.

*To all whom it may concern:*

Be it known that we, SAMUEL DAVIS and WINDSOR LELAND, of Chicago, in the county of Cook and State of Illinois, have invented a new and useful Improved Clutch-Hook for Slaughtering Purposes; and we do hereby declare and make known that the following is a full, clear, and exact description of the same, reference being had to the accompanying drawings, and the letters and figures marked thereon, which form part of this specification.

Our said invention consists in a novel and convenient device, designed for use, generally, in slaughter-houses, having more especial reference, however, to the slaughtering of swine, which may readily be attached or secured to the leg of the animal, so that it may be drawn up and suspended upon an appropriate support, in which position it is stuck, and which may as readily be detached from the leg of the animal, when desired, to let him drop into the scalding-tub.

To enable those skilled in the art to understand how to construct and use our invention, we will proceed to describe the same with particularity, making reference, in so doing, to the aforesaid drawings, in which—

Figure 1 represents a side view of our invention; Fig. 2, a side elevation of the apparatus, in connection with which the same is used, and Fig. 3 is an end view or elevation of the same.

Similar letters of reference in the several figures denote the same parts of our invention.

A represents a hook, provided at one end with an eye or link, *a*, and a recess upon its inner face marked *d*, its opposite end being attached to a chain, B, by a swivel-connection, *b*, as shown. At the opposite end of the chain B is attached a hook, C, which is provided with an eye or link, *c*, as shown in the drawings.

D represents a hook upon the end of a rope or chain, E, whereby the animal is drawn up by any suitable means, and suspended upon the inclined rod or bar F, as hereinafter specified. The said bar is supported or sustained by a series of hangers attached to the ceiling of the slaughter-house, (marked G,) as shown in Figs. 2 and 3.

H I represent a hook and chain used in releasing the animal from the clutch-hook and letting him down upon a slide, J, into a scalding-tub, T, when desired, as hereinafter described.

L represents an inclined rod upon which the hooks are placed, to be carried or slid back to the point where the hogs are caught.

Having described the construction of our invention, we will now describe its operation.

The pen in which the hogs are caught is supposed to be just at the left hand of Fig. 2.

The device shown in Fig. 1 is taken by the person who catches the hogs, and the hook C is thrown around one of the hind legs of the animal, and arranged upon the chain B in such a manner as to form a run through the hook, when the hook D is hooked into the eye *a* upon the hook A, when the power is applied upon the rope E and the animal is drawn up to such a height as will allow the hook A to be caught over the rod F, the recess *d* in said hook fitting upon said rod and preventing its slipping off. This position of the apparatus is indicated at the left hand of Fig. 2 in the drawings. The animal being suspended head downward is stuck, and gradually slides down upon the rod F toward the opposite end thereof. In the mean time another catching-hook is taken and another animal caught and suspended, and so on, until all are caught and killed. By the time the animal has slipped down to the opposite end of the rod F the blood has all flowed from its body, and it is ready for the scalding-tub.

To let him down into the tub, the attendant takes the hook H and attaches it to the eye or ring in the hook C just before the hook A reaches the end of the rod F, so that when said hook A drops from the end of the rod, the hog drops upon the slide J, and thence passes into the tub T, the hook or catching device being suspended from the hook H, as seen at the right-hand side of Fig. 2.

The catching-hooks are successively removed and placed upon the return-rod L, upon which they slide back to the point where they are used in catching the animals.

Having described the construction and operation of our invention, we will now specify what we claim and desire to secure by Letters Patent.

1. The combination of the hooks A and C, provided with the eyes or rings $a\ c$, respectively, and the chain B, operating substantially as specified, and for the purposes set forth.

2. The combination of the above-described device with an inclined rod or track, F, so arranged upon its supports as to allow the hook A to slide upon the same, substantially as and for the purposes described.

3. The combination and arrangement of the catching device A B C, the inclined rod F, and hook and chain H I, operating substantially as herein described, and for the purposes specified.

SAMUEL DAVIS.
WINDSOR LELAND.

Witnesses:
W. E. MAUS,
J. U. HERTHEL.